United States Patent
McMasters

(10) Patent No.: US 9,074,805 B2
(45) Date of Patent: Jul. 7, 2015

(54) METHOD AND APPARATUS FOR IMPROVING ACCURACY OF A/C DIAGNOSTIC TESTS

(75) Inventor: Mark McMasters, Owatonna, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 360 days.

(21) Appl. No.: 13/371,750

(22) Filed: Feb. 13, 2012

(65) Prior Publication Data

US 2013/0205806 A1   Aug. 15, 2013

(51) Int. Cl.
*F25D 15/00*   (2006.01)

(52) U.S. Cl.
CPC .................................. *F25D 15/00* (2013.01)

(58) Field of Classification Search
CPC .. F25B 45/00; F25B 2345/00; F25B 2600/05; F25B 2700/04; B60H 1/00585; F25D 15/00
USPC ........................................ 62/77, 292, 149, 125
See application file for complete search history.

(56) References Cited

U.S. PATENT DOCUMENTS

| | | | |
|---|---|---|---|
| 6,141,977 A * | 11/2000 | Zugibe | 62/149 |
| 6,185,945 B1 | 2/2001 | Pfefferle et al. | |
| 7,832,222 B2 * | 11/2010 | McMasters | 62/149 |
| 2002/0162351 A1 | 11/2002 | Findley et al. | |
| 2006/0236705 A1 | 10/2006 | Govekar et al. | |
| 2007/0006609 A1 | 1/2007 | Thomas et al. | |
| 2011/0160918 A1 | 6/2011 | McMasters et al. | |

OTHER PUBLICATIONS

Kool Kare User's Manual, Snap-on Technologies, 1998 [retrieved on Apr. 24, 2013]. Retrieved from the internet: <URL:hhttp://www.snaponequipment.com/Common/UserManuals/UM-EEAC104B.pdf> Introduction and pp. 1-1 to 3-14.
International Search Report and Written Opinion for PCT/US2013/025871 filed Feb. 13, 2013.

* cited by examiner

*Primary Examiner* — Mohammad M Ali
(74) *Attorney, Agent, or Firm* — Baker & Hostetler LLP

(57) ABSTRACT

An apparatus and method are developed to improve accuracy of diagnostic tests for A/C systems. In particular, a refrigerant recovery unit may have its hoses pre-charged with a refrigerant to a predetermined pressure or amount before performing the diagnostic tests on the A/C system of the vehicle. For example, a predetermine amount of refrigerant may be injected into the hoses of the refrigerant recovery unit to pre-charge them. The pre-charged hoses of the refrigerant recovery unit may prevent a refrigerant flow from the A/C system to the hoses connected thereto before the diagnostic tests are implemented and thus, improve the accuracy of the diagnostic tests.

9 Claims, 3 Drawing Sheets

METHOD AND APPARATUS FOR IMPROVING ACCURACY OF A/C DIAGNOSTIC TESTS

FIELD OF THE DISCLOSURE

The disclosure generally relates to a refrigerant recovery unit or a refrigerant recovery unit for vehicle air conditioning (A/C) systems, and more particularly to a refrigerant recovery unit that may improve an accuracy of diagnostic tests of the vehicle air condition systems.

BACKGROUND OF THE DISCLOSURE

Vehicle air conditioning (A/C) systems require maintenance, which includes refrigerant recovery, evacuation, recycling and recharging of the A/C systems. The refrigerant recovery unit may be portable and may connect to the A/C system of the vehicle to recover refrigerant out of the system, separate out contaminants and oil, and recharge the A/C system with additional refrigerant.

Also, the refrigerant recovery unit may perform diagnostic tests on the A/C system of the vehicles in order to determine faults of the A/C system. Conventionally, the refrigerant recovery unit may be coupled to the A/C system of the vehicle in order to measure a pressure of the A/C system. The refrigerant recovery unit may utilize the measured pressure to troubleshoot faults in the A/C system. However, the pressure of the A/C system measured by the refrigerant recovery unit may not be accurate because the measured pressure may be significantly affected by the performance of the A/C system. For example, refrigerant may leak from the A/C system into the service hoses of the refrigerant recovery unit and thus, may cause an inaccurate diagnostic test.

For example, the pressure of the A/C system may be measured based on an amount of refrigerant that travels from the A/C system to the refrigerant recovery unit. However, the A/C system's performance may significantly affect an amount of refrigerant that travels from the A/C system to the refrigerant recovery unit and thus, affect the measured pressure of the A/C system. Therefore, a need exists for an accurate and easy diagnostic test for A/C system of vehicles using the refrigerant recovery unit.

SUMMARY OF THE DISCLOSURE

The foregoing needs are met, to a great extent, by the present disclosure, wherein in one aspect, an apparatus and a method are provided that in some embodiments include a refrigerant recovery unit or a refrigerant recovery unit that improves the accuracy of A/C system diagnostic.

In accordance with one embodiment of the present invention, a method for performing a diagnostic test of a refrigerant system, the method may include the steps of: measuring a first amount of refrigerant in a storage tank with a scale of a refrigerant recovery unit, pre-charging a first service hose with a first predetermined amount of refrigerant from the storage tank of the refrigerant recovery unit, pre-charging a second service hose with a second predetermined amount of refrigerant from the storage tank of the refrigerant recovery unit, recovering refrigerant from the refrigerant system into the storage tank using the first service hose and the second service hose, measuring a second amount of refrigerant in the storage tank after recovering the refrigerant with the scale of the refrigerant recovery unit, and determining, with a processor of the refrigerant recovery unit, a recovered amount of refrigerant based at least in part on the first amount of refrigerant in the storage tank and the second amount of refrigerant in the storage tank.

In accordance with another embodiment of the present disclosure, an apparatus is provided for performing a diagnostic test on a refrigerant system including a first service hose configured to connect to a first port of the refrigerant system, wherein the first service hose is pre-charged with a first amount of refrigerant from a storage tank, a second service hose configured to connect to a second port of the refrigerant system, wherein the second service hose is pre-charged with a second amount of refrigerant from the storage tank, a compressor configured to recover refrigerant from the refrigerant system to the storage tank using the first service hose and the second service hose, a scale configured to measure a first amount of refrigerant in the storage tank before recovering the refrigerant and measuring second amount of refrigerant in the storage tank after recovering the refrigerant, and a controller configured to determine a recovered amount of refrigerant based at least in part on the first amount of refrigerant in the storage tank and the second amount of refrigerant in the storage tank.

In accordance with yet another embodiment of the present disclosure, an apparatus is provided for performing a diagnostic test of a refrigerant system including first means for connecting to a first port of the refrigerant system, wherein the first means for connecting is pre-charged with a first amount of refrigerant from means for storing, second means for connecting to a second port of the refrigerant system, wherein the second means for connecting is pre-charged with a second amount of refrigerant from the means for storing, means for compressing configured to recover refrigerant from the refrigerant system to the means for storing using the first means for connecting and the second means for connecting, means for measuring a first amount of refrigerant in the means for storing before recovering the refrigerant and measuring a second amount of refrigerant in the means for storing after recovering the refrigerant, and means for controlling configured to determine a recovered amount of refrigerant based at least in part on the first amount of refrigerant in the means for storing and the second amount of refrigerant in the means for storing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of the construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE DISCLOSURE

An apparatus and method are developed to improve accuracy of diagnostic tests for A/C systems. In particular, a refrigerant recovery unit may have its hoses pre-charged with a refrigerant to a predetermined pressure or amount before performing the diagnostic tests on the A/C system of the vehicle. For example, a predetermine amount of refrigerant may be injected into the hoses of the refrigerant recovery unit to pre-charge them. The pre-charged hoses of the refrigerant recovery unit may prevent a refrigerant flow from the A/C system to the hoses connected thereto before the diagnostic tests are implemented and thus, improve the accuracy of the diagnostic tests.

Currently, the most common refrigerant used in vehicle refrigerant systems is the HFC-134a. However, new refrigerants are being introduced in order to decrease global warming that can be caused by HFC-134a. These new refrigerants, for example, include HFO-1234yf and R-152a, and can also be used in the various embodiments described herein.

Figure 1:
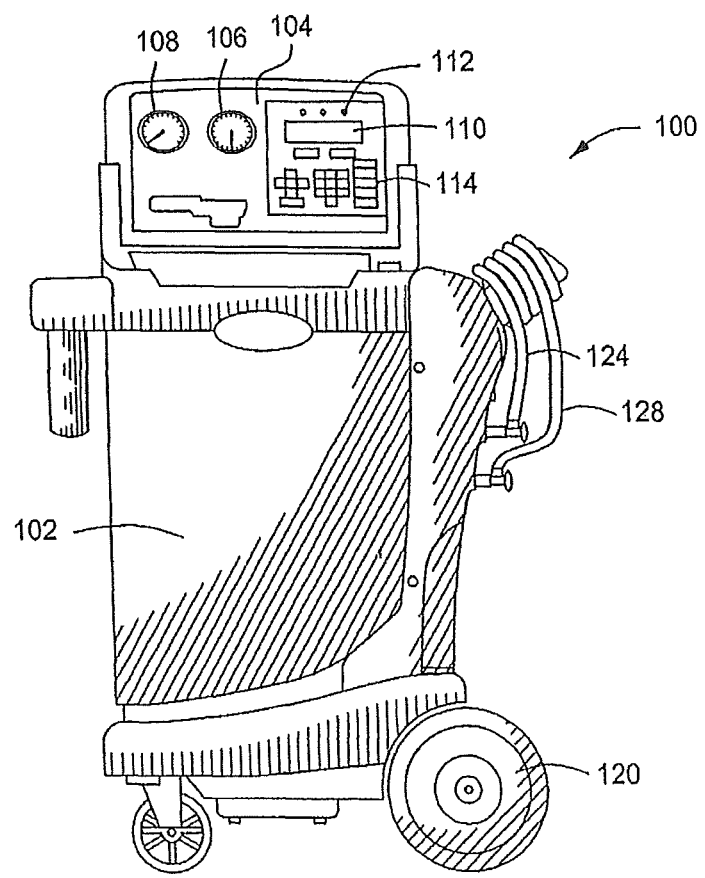
FIG. 1 is a perspective view of a refrigerant recovery unit according to an exemplary embodiment of the present disclosure.

FIG. 1 is a perspective view illustrating a refrigerant recovery unit 100 according to an embodiment of the present disclosure. The refrigerant recovery unit 100 can be the CoolTech 34788™ from Robinair™ based in Owatonna, Minn. (a business unit of SPX Corporation). The refrigerant recovery unit 100 includes a cabinet 102 to house components of the system (See FIG. 2). The cabinet 102 may be made of any material such as thermoplastic, steel and the like.

The cabinet 102 includes a control panel 104 that allows the user to operate the refrigerant recovery unit 100. The control panel 104 may be part of the cabinet as shown in FIG. 1 or separated. The control panel 104 includes high and low gauges 106, 108, respectively. The gauges may be analog or digital as desired by the user. The control panel 104 has a display 110 to provide information to the user, such as certain operating status of the refrigerant recovery unit 100 or provide messages or menus to the user, Located near the display 110 are LEDs 112 to indicate to the user the operational status of the refrigerant recovery unit 100. A user interface 114 is also included on the control panel 104. The user interface 114 allows the user to interact and operate the refrigerant recovery unit 100 and can include an alphanumeric keypad and directional arrows.

Figure 2:
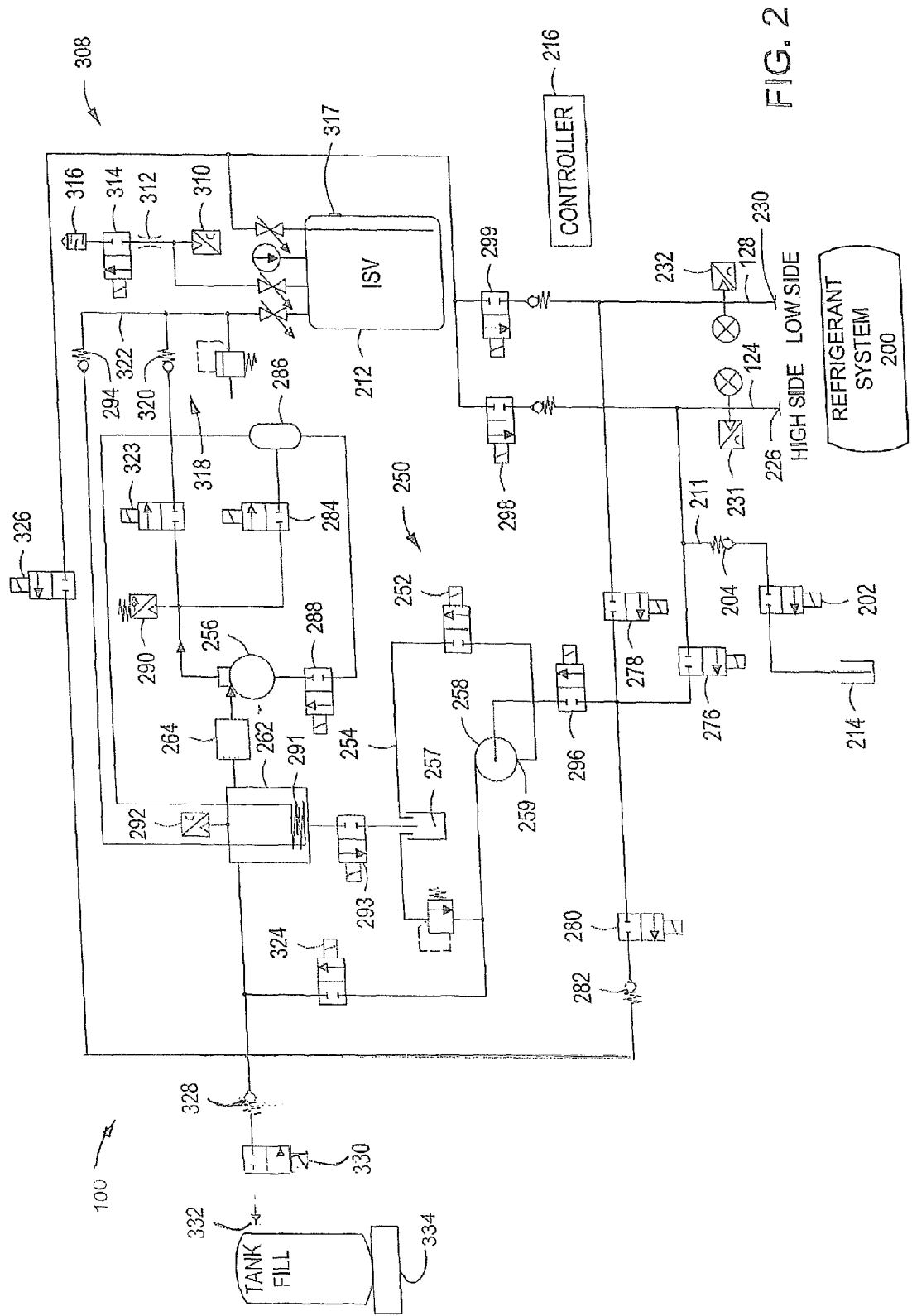
FIG. 2 illustrates components of the refrigerant recovery unit shown in FIG. 1 according to an exemplary embodiment of the present disclosure.

The cabinet 102 further includes connections for hoses 124, 128 that connect the refrigerant recovery unit 100 to a refrigerant containing device, such as the vehicle's refrigerant system 200 (shown in FIG. 2). In order for the refrigerant recovery unit 100 to be mobile, wheels 120 are provided at a bottom portion of the system.

FIG. 2 illustrates components of the refrigerant recovery unit 100 of FIG. 1 according to an embodiment of the present disclosure. In one embodiment, to recover refrigerant, service hoses 124 and 128 are coupled to the refrigeration system 200 of the vehicle, via couplers 226 (high side) and 230 (low side), respectively. The couplers are designed to be closed until they are coupled to the refrigerant system 200.

The recovery cycle is initiated by the opening of high pressure and low-pressure solenoids 276, 278, respectively. This allows the refrigerant within the vehicle's refrigeration system 200 to flow through a recovery valve 280 and a check valve 282. The refrigerant flows from the check valve 282 into a system oil separator 262, where it travels through a filter/dryer 264, to an input of a compressor 256. Refrigerant is drawn through the compressor 256 through a normal discharge solenoid 284 and through a compressor oil separator 286, which circulates oil back to the compressor 256 through an oil return valve 288. The refrigerant recovery unit 100 may include a high-pressure switch 290 in communication with a controller 216, which is programmed to determine an upper pressure limit, for example, 435 psi, to optionally shut down the compressor 256 to protect the compressor 256 from excessive pressure. The controller 216 can also be, for example, a microprocessor, a field programmable gate array (FPGA) or application-specific integrated circuit (ASIC). The controller 216 via a wired or wireless connection (not shown) controls the various valves and other components (e.g. vacuum, compressor) of the refrigerant recovery unit 100. In some embodiments of the present disclosure, any or all of the electronic solenoid or electrically activated valves may be connected and controlled by the controller 216.

A high-side clear solenoid (not shown) may optionally be coupled to the output of the compressor 256 to release the recovered refrigerant transferred from compressor 256 directly into a storage tank 212, instead of through a path through the normal discharge solenoid 284.

The heated compressed refrigerant exits the oil separator 286 and then travels through a loop of conduit or heat exchanger 291 for cooling or condensing. As the heated refrigerant flows through the heat exchanger 291, the heated refrigerant gives off heat to the cold refrigerant in the system oil separator 262, and assists in maintaining the temperature in the system oil separator 262 within a working range. Coupled to the system oil separator 262 is a switch or transducer 292, such as a low pressure switch or pressure transducer, for example, that senses pressure information, and provides an output signal to the controller 216 through a suitable interface circuit programmed to detect when the pressure of the recovered refrigerant is down to 13 inches of mercury, for example. An oil separator drain valve 293 drains the recovered oil into the container 257. Finally, the recovered refrigerant flows through a normal discharge check valve 294 and into the storage tank 212.

The evacuation cycle begins by the opening of high pressure and low-pressure solenoids 276 and 278 and valve 296, leading to the input of a vacuum pump 258. Prior to opening valve 296, an air intake valve (not shown) is opened, allowing the vacuum pump 258 to start exhausting air. The vehicle's refrigerant system 200 is then evacuated by the closing of the air intake valve and opening the valve 296, allowing the vacuum pump 258 to exhaust any trace gases remaining until the pressure is approximately 29 inches of mercury, for example. When this occurs, as detected by pressure transducers 231 and 232, optionally, coupled to the high side 226 and low side 230 of the vehicle's refrigeration system 200 and to the controller 216, the controller 216 turns off valve 296 and this begins the recharging cycle.

The recharging cycle begins by opening charge valve 298 to allow the refrigerant in storage tank 212, which is at a pressure of approximately 70 psi or above, to flow through the high side of the vehicle's refrigeration system 200. The flow is through charge valve 298 for a period of time programmed to provide hill charge of refrigerant to the vehicle. Optionally, charge valve 299 may be opened to charge the low side. The charge valve 299 may be opened alone or in conjunction with charge valve 298 to charge the vehicle's refrigerant system 200. The storage tank 312 may be disposed on a scale 334 that measure the weight of the refrigerant in the storage tank.

Other components shown in FIG. 2 include an oil inject circuit having an oil inject valve 202 and an oil inject hose or line 211. The oil inject hose 211 is one example of a fluid transportation means for transmitting oil for the refrigerant recovery unit 100. The oil inject hose 211 may be one length of hose or multiple lengths of hose or tubing or any other suitable means for transporting fluid. The oil inject hose 211 connects on one end to an oil inject bottle 214 and on the other end couples to the refrigerant circuit in the refrigerant recovery unit 100. Disposed along the length of the oil inject hose 211 are the oil inject valve 202 and an oil cheek valve 204. The oil inject path follows from the oil inject bottle 214, though the oil inject solenoid 202, to the junction with the high side charge line, and to the vehicle's refrigerant system 200.

FIG. 2 also illustrates a vacuum pump oil drain circuitry 250 that includes a vacuum pump oil drain valve 252 that is located along a vacuum pump oil drain conduit 254 connecting a vacuum pump oil drain outlet 259 to a container 257 for containing the drained vacuum pump oil. The vacuum pump oil drain valve 252 may be an electronically activated solenoid valve controlled by controller 216. The connection may be a wireless or wired connection. In other embodiments the valve 252 may be a manually activated valve and manually actuated by a user. The conduit 254 may be a flexible hose or any other suitable conduit for provided fluid communication between the outlet 256 and the container 257.

FIG. 2 also illustrates an air purging apparatus 308. The air purging apparatus 308 allows the refrigerant recovery unit 100 to be purged of non-condensable, such as air. Air purged from the refrigerant recovery unit 100 may exit the storage tank 212, through an orifice 312, through a purging valve 314 and through an air diffuser 316. In some embodiments, the orifice may be 0.028 of an inch. A pressure transducer 310 may measure the pressure contained within the storage tank 212 and purge apparatus 308. The pressure transducer 310 may send the pressure information to the controller 216. And when the pressure is too high, as calculated by the controller, purging is required. The valve 314 may be selectively actuated to permit or not permit purging apparatus 308 to be open to the ambient conditions. A temperature sensor 317 may be coupled to the main tank to measure the refrigerant temperature therein. The placement of the temperature sensor 317 may be anywhere on the tank or alternatively, the temperature sensor may be placed within a refrigerant line 322. The measured temperature and pressure may be used to calculate the ideal vapor pressure for the type of refrigerant used in the refrigerant recovery unit. The ideal vapor pressure can be used to determine when the non-condensable gases need to be purged and how much purging will be done in order to get the refrigerant recovery unit to function properly.

High side clearing valves 318 may be used to clear out part of the high-pressure side of the system. The high side clearing valves 318 may include valve 323 and check valve 320. Valve 323 may be a solenoid valve. When it is desired to clear part of the high side, valve 323 is opened. Operation of the compressor 256 will force refrigerant out of the high pressure side through valves 323 and 320 and into the storage tank 212. During this procedure the normal discharge valve 284 may be closed.

A deep recovery valve 324 is provided to assist in the deep recovery of refrigerant. When the refrigerant from the refrigerant system 200 has, for the most part, entered into the refrigerant recovery unit 100, the remaining refrigerant may be extracted from the refrigerant system 200 by opening the deep recovery valve 324 and turning on the vacuum pump 258.

In another embodiment, in order to charge the refrigerant system 200, the power charge valve 326 may be opened and a tank fill structure 332 may be used. Alternatively or in addition to, the tank fill structure 332 may also be used to fill the storage tank 312. In order to obtain refrigerant from a refrigerant source, the refrigerant recovery unit 100 may include the tank fill structure 332, and valves 328 and 330. The tank fill structure 332 may be configured to attach to a refrigerant source. The valve 330 may be a solenoid valve and the valve 328 may be a check valve. In other embodiments, valve 330 may be a manually operated valve.

When it is desired to allow refrigerant from a refrigerant source to enter the refrigerant recovery unit 100, the tank fill structure 332 is attached to the refrigerant source and the tank fill valve 330 is opened. The check valve 328 prevents refrigerant from the refrigerant recovery unit 100 from flowing out of the refrigerant recovery unit 100 through the lank fill structure 332. When the tank fill structure 332 is not connected to a refrigerant source, the tank fill valve 330 is kept closed. The tank fill valve 330 may be connected to and controlled by the controller 216.

The tank fill structure 332 may be configured to be seated on the scale 334 configured to weigh the tank fill structure 332 in order to determine an amount of refrigerant stored in the tank fill structure 332. The scale 334 may be operatively coupled to the controller 216 and provide a measurement of a weight of the tank fill structure 332 to the controller 216. The controller 216 may cause a display of the weight of the tank fill structure 332.

Figure 3:
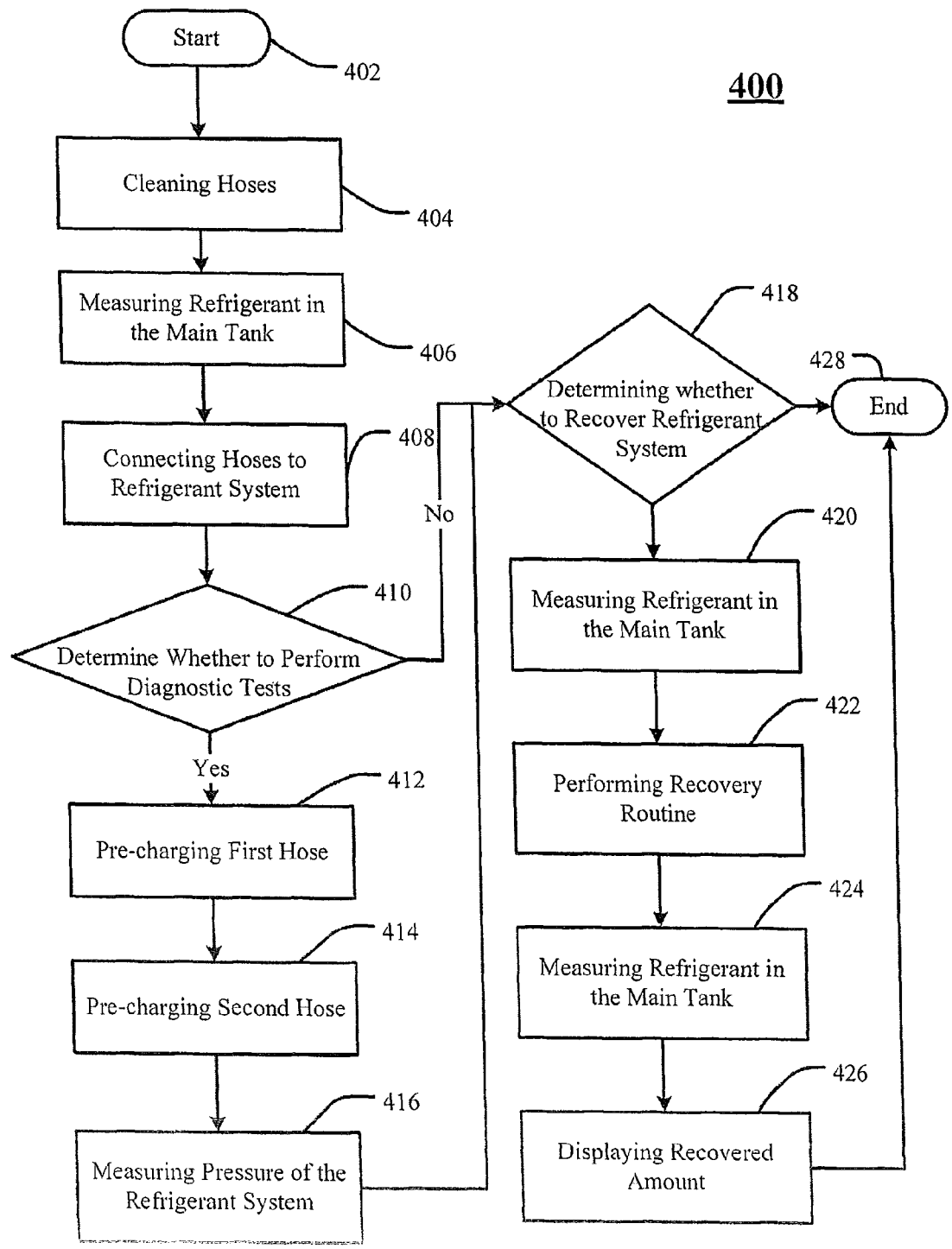
FIG. 3 is a flow diagram for improving accuracy of A/C diagnostic tests according to an exemplary embodiment of the present disclosure.

FIG. 3 is a flow diagram for improving accuracy of A/C diagnostic tests according to an embodiment of the present disclosure. This exemplary method 400 may be provided by way of example, as there are a variety of ways to carry out the method. The method 400 shown in FIG. 3 can be executed or otherwise performed by one or a combination of various systems. The method 400 is described below may be carried out by the system and components shown in FIGS. 1-2, by way of example, and various elements of the system are referenced in explaining the exemplary method of FIG. 3. Each block shown in FIG. 3 represents one or more processes, methods, or subroutines carried out in exemplary method 400. However, the steps do not have to be performed in any certain order or performed at all.

At step 402, the method 400 for performing an improved diagnostic test of a refrigerant system 200 of a vehicle may begin.

At step 404, service hoses are cleaned. Service hoses 124 and 128 of the refrigerant recovery unit 100 may be cleaned before performing the diagnostic test on the refrigerant system 200. For example, oils and contaminants from the service hoses 124 and 128 and associated refrigerant control circuit are flushed and the service hoses 124 and 128 are cleaned. Also, any remnants of refrigerants that may remain in the services hoses 124 and 128 may be cleaned or flushed out before performing the diagnostic test on the refrigerant system 200 in order to achieve accurate diagnostic results. For example, the refrigerant recovery unit 100 may inject refrigerant into one of the service hoses 128 (e.g., low pressure service hose) and out of one of the service hoses 124 (e.g., high pressure service hose) when they are coupled together. The refrigerant recovery unit 100 may continue to inject refrigerant into the service hoses 124 and 128 until oil and containments are flushed out of the service hoses 124 and 128. In an exemplary embodiment, a method of cleaning the service hoses 124 and 128 is disclosed in U.S. patent application Ser. No. 12/248,352, which is incorporated by reference in its entirety. Step 404 does not have to be performed if for example, the hoses are new or the refrigerant recovery unit 100 is new. After, cleaning the service hoses 124 and 128, the method 400 may proceed to step 406.

At step 406, an amount of refrigerant stored in the tank fill structure or storage tank may be measured. For example, the refrigerant recovery unit 100 may measure an amount of refrigerant stored in the tank fill structure 332 or storage tank 212 before performing a diagnostic test on the refrigerant system 200. In an exemplary embodiment, the scale 334 may measure the weight of art amount of refrigerant stored in the tank fill structure 332 or storage tank 212 and may provide the weight to the controller 216 for storing and processing. After measuring an amount of refrigerant stored in the tank fill structure, the method 400 may proceed to step 408.

At step 408, the service hoses are connected to the refrigerant system 200. For example, service hose 124 (e.g., high pressure service hose and red color) may be coupled to a high-pressure fluid transmitting port of the refrigerant system 200 via the coupler 226. Service hose 128 (e.g., low pressure service hose and blue color) may be coupled to a low-pressure fluid transmitting port of the refrigerant system 200 via the coupler 230. After connecting the service hoses 124 and 128 to the refrigerant system 200, the method 400 may proceed to step 410.

At step 410, whether to perform a diagnostic test of the refrigerant system 200 may be determined. For example, the refrigerant recovery unit 100 may receive a selection to perform a diagnostic test on the refrigerant system 200 or may receive a selection to recover refrigerant from the refrigerant system 200. In the event that the refrigerant recovery unit 100 determines to perform a diagnostic test on the refrigerant system 200, the method 400 may proceed to step 412. In the event that the refrigerant recovery unit 100 determines not to perform a diagnostic test on the refrigerant system 200, the method 400 may proceed to step 418.

At step 412, a first service hose may be pre-charged before the diagnostic test commences. For example, a high-pressure service hose 124 (e.g., red color coded) may be pre-charged with a predetermined or programmable amount of refrigerant or pressure from the tank fill structure 332 or storage tank 212. In an exemplary embodiment, the high-pressure service hose 124 may be pre-charged to a pressure of 110-130 psi with approximately 60 grams of refrigerant. For example, an amount of refrigerant pre-charged into the high-pressure service hose 124 may vary based on the ambient temperature. Open the valve 298 or the valve 299. By pre-charging the service hose 124, the amount of refrigerant in the refrigerant system 200 will not change during the diagnostic test. Often, when the services hoses 124 and 128 are hooked up to the refrigerant system 200 for testing, refrigerant from the refrigerant system 200 may leak into the service hoses 124 and 128 before the diagnostic test and thus, inaccurate measurements (i.e. the amount of refrigerant in the system) of the refrigerant system 200 can occur. After pre-charging a first service hose 124, the method 400 may proceed to step 414.

At step 414, a second service hose may be pre-charged. For example, a low-pressure service hose 128 (e.g., blue color coded) may be pre-charged with a predetermined or programmable amount of refrigerant or pressure from the tank fill structure 332 or storage tank 212. In an exemplary embodiment, the low-pressure service hose 128 may be pre-charged to a pressure of 30-40 psi with approximately 1-5 grams of refrigerant. The amount of refrigerant pre-charged into the low-pressure service hose 128 may vary based on the ambient temperature. By pre-charging the service hose 128, the amount of refrigerant in the refrigerant system 200 will not change during the diagnostic test. After pre-charging a second service hose 128, the method 400 may proceed to step 416.

At step 416, the pressure of the refrigerant system 200 may be measured. For example, the refrigerant system 200 may be initiated and turned to an "ON' state. The refrigerant recovery unit 100 may measure the pressure of the refrigerant system 200. For example, the pressure transducers 231 and 232 coupled to the service hoses 124 and 128 may measure the pressure of the refrigerant system 200 after the refrigerant system 200 is turned to the "ON' state. During the diagnostic test, an amount of refrigerant in the refrigerant system 200 should not change because the first service hose 124 and the second service hose 128 are pre-charged with refrigerant from the tank fill structure 332 or storage tank 312. Thus, a more accurate pressure reading of the refrigerant system 200 may be determined by the refrigerant recovery unit 100. After measuring pressure of the refrigerant system 200, the method 400 may proceed to step 418.

At step 418, whether to recover the refrigerant system 200 may be determined. During the recovery cycle, the refrigerant located within the refrigerant system 200 may flow from the refrigerant system 200 to the service hoses 124 and 128 and refrigerant may be recovered by the refrigerant recovery unit 100, as described above. In the event that the refrigerant system 200 is not recovered, the method 400 may proceed to step 428 and end. In the event that the refrigerant system 200 is recovered, the method 400 may proceed to step 420.

At step 420, the amount of refrigerant left in the tank fill structure 332 or storage tank 212 after pre-charging the service hoses 124 and 128 may be measured. For example, the scale 334 may measure the weight of the refrigerant left in the tank fill structure 332 or storage tank 212 after pre-charging the service hoses 124 and 128 and may provide the weight to the controller 216 for storing and processing. After measuring the amount of refrigerant left in the tank fill structure 332 or storage tank 312 after pre-charging the service hoses 124 and 128, the method 400 may proceed to step 422.

At step 422, recovery of refrigerant from the refrigerant system 200 may be performed. For example, the recovery cycle is initiated by connecting service hoses 124 and 128 to the refrigerant system 200, if they are not already connected. This allows the refrigerant within the refrigerant system 200 to flow through a refrigerant control circuit of the refrigerant recovery unit 100. The refrigerant may be recovered from the refrigerant system 200 by the refrigerant recovery unit 100, as described above. After performing recovery of refrigerant from the refrigerant system 200, the method 400 may proceed to step 424.

At step 424, the amount of refrigerant in the tank fill structure 332 or storage tank 212 may be measured after the recovery process. For example, the scale 334 may measure the weight of the refrigerant stored in the tank fill structure 332 or storage tank 212 after the recovery process is performed on the refrigerant system 200 and may provide the weight to the controller 216 for storing and processing. After measuring an amount of refrigerant in the tank fill structure 332 or storage tank 212 after the recovery process, the method 400 may proceed to step 426.

At step 426, the recovered amount of refrigerant recovered from refrigerant system 200 may be displayed on the display 110. The controller 216 may calculate the amount of refrigerant recovered from the refrigerant system 200 by determining a difference between an amount of refrigerant stored in the tank fill structure 332 or storage tank 212 before the recovery process and an amount of refrigerant stored in the tank fill structure 332 or storage tank 212 after the recovery process. In another example, the controller 216 may calculate the amount of refrigerant recovered from the refrigerant system 200 by subtracting the amount of refrigerant stored in the tank fill structure 332 or storage tank 212 before the recovery process plus the amount of refrigerant pre-charged into both the high pressure and low pressure service hose 124 and 128 from the amount of refrigerant stored in the tank fill structure 332 or storage tank 212 after the recovery process. After displaying the amount of refrigerant recovered from the refrigerant system 200, the method 400 may proceed to step 428 and end.

It can be understood that the method and apparatus for improving accuracy of A/C diagnostic tests of a refrigerant recovery unit described and illustrated herein are examples only. The methods and apparatuses described herein can be used for any refrigerant including R134A, however, the present disclosure can also be used for HFO1234YF, CO2, and other similar refrigerant systems. It is contemplated and within the scope of the disclosure to construct a wide range of refrigerant recovery unit to meet particular design and requirements in a wide range of applications. A refrigerant recovery unit may be fitted with a single vehicle service hose, for example, to accommodate refrigerant systems having only one port to charge and recover from, and the refrigerant recovery unit may be modified accordingly to flush the one service hose. The service hose(s) may be fitted with fittings other than R134a fittings, such as where other types of refrigerant are used. The construction of the fluid hose for connecting the pair of fluid transmitting ports may have different dimensions or configurations from that illustrated, and its size and shape may vary. The fluid hose may have fittings other than J639 type vehicle ports, and the fluid connector may be bypassed entirely.

The many features and advantages of the invention are apparent from the detailed specification, and thus, it is intended by the appended claims to cover all such features and advantages of the invention, which fall within the true spirit, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for performing a diagnostic test on a refrigerant system, comprising:
    a first service hose configured to connect to a first port of the refrigerant system, the first service hose being pre-charged with a first amount of refrigerant from a storage tank before performing the diagnostic test, wherein the first amount of refrigerant is based on an ambient temperature;
    a second service hose configured to connect to a second port of the refrigerant system, the second service hose being pre-charged with a second amount of refrigerant from the storage tank before performing the diagnostic test, wherein the second amount of refrigerant is based on the ambient temperature;
    a compressor configured to recover refrigerant from the refrigerant system to the storage tank using the first service hose and the second service hose;
    a scale configured to measure a pre-recovery amount of refrigerant in the storage tank before recovering the refrigerant, measure a post-recovery amount of refrigerant in the storage tank after recovering the refrigerant, and measure a third amount of refrigerant in the storage tank after pre-charging the first service hose and the second service hose; and
    a controller configured to determine a recovered amount of refrigerant, wherein the recovered amount of refrigerant is a difference determined by subtracting the pre-recovery amount of refrigerant stored in the storage tank plus the amount of refrigerant pre-charged into the first service hose and the second service hose from the post-recovery amount of refrigerant stored in the storage tank.

2. The apparatus according to claim 1, wherein the controller conducts the diagnostic test on the refrigerant system after the first service hose and the second service hose are pre-charged.

3. The apparatus according to claim 1, further comprising an oil separator for separating oil from the recovered refrigerant.

4. The apparatus according to claim 1, wherein the first service hose and the second service hose are cleaned before charging the refrigerant system.

5. The apparatus of claim 1, wherein the precharged first and second service hoses prevent refrigerant from the refrigerant system from entering the first and second service hoses before the diagnostic test is conducted.

6. An apparatus for performing a diagnostic test of a refrigerant system, comprising:
    first means for connecting to a first port of the refrigerant system, wherein the first means for connecting being pre-charged with a first amount of refrigerant from means for storing;
    second means for connecting to a second port of the refrigerant system, the second means for connecting being pre-charged with a second amount of refrigerant from the means for storing;
    means for compressing configured to recover refrigerant from the refrigerant system to the means for storing using the first means for connecting and the second means for connecting;
    means for measuring a pre-recovery amount of refrigerant in the means for storing before recovering the refrigerant, a post-recovery amount of refrigerant in the mean for storing after recovering the refrigerant, and a third amount of refrigerant in the means for storing after pre-charging the first means for connecting and the second means for connecting; and
    means for controlling configured to determine a recovered amount of refrigerant, wherein the recovered amount of refrigerant is a difference determined by subtracting the pre-recovery amount of refrigerant stored in the means for storing plus the amount of refrigerant pre-charged into the first means for connecting and the second means for connecting from the post-recovery of refrigerant stored in the means for storing.

7. The apparatus according to claim 6, wherein the means for controlling conducts the diagnostic test on the refrigerant system after the first means for connecting and the second means for connecting are pre-charged.

8. The apparatus according to claim 6, further comprising an oil separator for separating oil from the recovered refrigerant.

9. The apparatus according to claim 6, wherein the first means for connecting and the second means for connecting are cleaned before charging the refrigerant system.

* * * * *